C. DAVIS.
LAMP FOR MOTOR ROAD VEHICLES.
APPLICATION FILED AUG. 29, 1908.
912,232.
Patented Feb. 9, 1909.
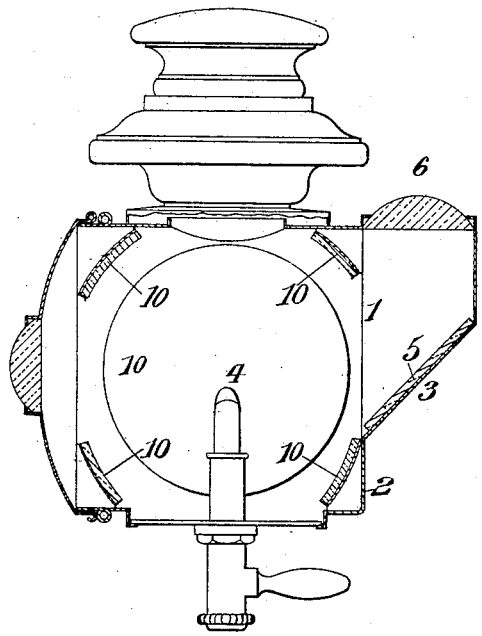
WITNESSES
Charles C. Abbe
L. H. Grote
INVENTOR
Charles Davis
By Howson and Howson
Attorneys

UNITED STATES PATENT OFFICE.

CHARLES DAVIS, OF LONDON, ENGLAND.

LAMP FOR MOTOR ROAD-VEHICLES.

No. 912,232.  Specification of Letters Patent.  Patented Feb. 9, 1909.

Application filed August 29, 1908. Serial No. 450,835.

*To all whom it may concern:*

Be it known that I, CHARLES DAVIS, a subject of the King of Great Britain and Ireland, of 147 New Bond street, in the county of London, England, art expert, have invented new and useful Improvements in Lamps for Motor Road-Vehicles, of which the following is a specification.

At night-time considerable danger may arise from the fact that the light from motor road vehicle lamps, as hitherto constructed, cannot be seen under certain conditions, such, for instance, as in the case of vehicles approaching each other, or running on a road with several turns in it, or with a high hedge, or an avenue of trees, or other obstacle, between the vehicle and another road, persons in which should be warned of the approach of the vehicle.

According to my invention I provide a lamp burning acetylene, petrol, or other like combustible, the rays from which besides being directed as usual in the direction in which the vehicle is traveling, or sidewise, or at any required angle, (for instance, to illuminate a number plate), or in more than one of these additional directions, are also projected upward so that the light emitted can be seen for a considerable distance above the vehicle and above obstacles, the arrangement being such that the heat and fumes can escape from the upper part of the lamp in the usual way. I may, for instance employ a lamp at the rear of the vehicle, which lamp projects a red, or other, light rearwards, and which also directs light onto a number plate on the vehicle, as well as directing light upwards in accordance with my invention. The products of combustion are allowed to escape at the upper part of the lamp in the usual way, and a side casing is attached to the lamp-casing proper, and a passage for light is made between the two casings (the said opening being covered, or not, with glass, or other transparent material), so that rays of light from the lamp strike a reflector in the side casing, the said reflector being arranged at such an angle as to deflect the rays of light upward through a lens, (commonly called a "bull's-eye") in an opening in the upper part of the said side casing.

The accompanying drawing represents in vertical transverse section a lamp embodying my invention.

I make an opening 1 in the lamp-casing proper 2, and over this opening 1 I affix a side casing 3, so that the rays of light from the lamp proper 4 strike the reflector 5, fixed in the casing 3, at an angle, as shown, and the said rays are deflected upwards through the lens, or "bull's-eye" 6 fixed in an opening in the top of the side casing 3.

Any suitable arrangement of reflectors may be used in the lamps. I have shown reflectors at 10, but they may be arranged in any other desired way.

The lamp may be supported in any suitable manner, so that the upward rays are not impeded by anything above the lamp (for example by the hood of the motor vehicle), there being, if necessary, a sufficiently extended projection from the vehicle to carry the lamp clear of any such obstruction.

I claim as my invention—

A lamp for motor road vehicles, comprising a burner, a casing therefor with ventilator above the burner, in combination with a side chamber opening into the burner chamber, a substantially horizontal lens in the top of said side chamber and a reflector in the latter adapted to direct upward through said lens the light from the burner so as to act as a warning signal visible above obstructions, substantially as described.

In testimony whereof I have signed my name to this specification in the presence of two subscribing witnesses.

CHARLES DAVIS.

Witnesses:
  GEORGE ALEXANDER HOWE,
  WILLIAM GERALD REYNOLDS.